(12) United States Patent
Edwards et al.

(10) Patent No.: US 7,200,379 B2
(45) Date of Patent: Apr. 3, 2007

(54) LOW-POWER MODE CLOCK MANAGEMENT FOR WIRELESS COMMUNICATION DEVICES

(75) Inventors: Bruce E. Edwards, Belmont, MA (US); Mark D. Matson, Acton, MA (US)

(73) Assignee: Broadcom Corporation, Irvine, CA (US)

( * ) Notice: Subject to any disclaimer, the term of this patent is extended or adjusted under 35 U.S.C. 154(b) by 111 days.

(21) Appl. No.: 10/810,199

(22) Filed: Mar. 26, 2004

(65) Prior Publication Data
US 2005/0215275 A1  Sep. 29, 2005

(51) Int. Cl.
*H04B 1/16* (2006.01)
(52) U.S. Cl. .................... 455/343.1; 455/258
(58) Field of Classification Search ............... 455/258, 455/255, 256, 260, 343.1, 343.4, 343.5; 331/2, 331/14, 49; 327/105
See application file for complete search history.

(56) References Cited

U.S. PATENT DOCUMENTS

| | | | | |
|---|---|---|---|---|
| 5,548,250 A | * | 8/1996 | Fang ........................... | 331/14 |
| 5,950,120 A | * | 9/1999 | Gardner et al. ........... | 455/343.1 |
| 5,995,820 A | * | 11/1999 | Young et al. ............ | 455/343.1 |
| 6,366,768 B1 | * | 4/2002 | Tessier et al. .............. | 455/260 |
| 6,473,607 B1 | * | 10/2002 | Shohara et al. .......... | 455/343.1 |
| 6,804,503 B2 | * | 10/2004 | Shohara et al. .......... | 455/343.4 |
| 2004/0067742 A1 | * | 4/2004 | Ormson ...................... | 455/258 |

* cited by examiner

*Primary Examiner*—Edward Urban
*Assistant Examiner*—Blane J. Jackson
(74) *Attorney, Agent, or Firm*—Garlick Harrison & Markison; Bruce E. Garlick

(57) ABSTRACT

A power management scheme for a wireless communications device substantially implemented on a single CMOS integrated circuit is described. The present invention provides a method and apparatus for generating first and second clock signals for a wireless communication device, with the first and second clock signals corresponding first and second power levels, depending on the operating mode of the wireless communication unit. In the first operating state, the transceiver in the RF analog module is operational and the clock generator provides a first clock signal having the high-speed, high-accuracy characteristics necessary to maintain efficient operation of the transceiver. In a second operating state, the transceiver in the RF analog module is turned off. In this second operational state, the clock generator provides a second clock signal having a frequency and quality sufficient to maintain efficient operation of the digital modules in the wireless communication device. In the second operational state, the high-speed, high-accuracy clock is replaced by a low-power oscillator when the wireless communication unit is operating in a low power mode.

4 Claims, 3 Drawing Sheets

LOW-POWER MODE CLOCK MANAGEMENT FOR WIRELESS COMMUNICATION DEVICES

BACKGROUND OF THE INVENTION

1. Field of the Invention

The present invention relates in general to the field of data processing. In one aspect, the present invention relates to a method and system for managing clock functions in a communications processor during operation in a low-power mode.

2. Related Art

In general, data processors are capable of executing a variety of instructions. Processors are used in a variety of applications, including communication systems formed with wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital amps, global system for mobile communications (GSM), code division multiple access (CDMA), local multi-point distribution systems (LMDS), multi-channel-multi-point distribution systems (MMDS) and/or variations thereof.

Especially with wireless and/or mobile communication devices (such as a cellular telephone, two-way radio, personal digital assistant (PDA), personal computer (PC), laptop computer, home entertainment equipment, etc.), the processor or processors in a device must be able to run various complex communication programs using only a limited amount of power that is provided by power supplies, such as batteries, contained within such devices. In particular, for a wireless communication device to participate in wireless communications, the device includes a built-in radio transceiver (i.e., receiver and transmitter) or is coupled to an associated radio transceiver (e.g., a station for in-home and/or in-building wireless communication networks, RF modem, etc.).

To implement the transceiver function, one or more processors and other modules are used to form a transmitter which typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna. In direct conversion transmitters/receivers, conversion directly between baseband signals and RF signals is performed. In addition, one or more processors and other modules are used to form a receiver which is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out-of-band signals to produce filtered signals. The data recovery stage recovers raw data from the filtered signals in accordance with the particular wireless communication standard.

In addition to the complexity of the computational requirements for a communications transceiver, such as described above, the ever-increasing need for higher speed communications systems imposes additional performance requirements and resulting costs for communications systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS. To this end, digital signal processing ("DSP") techniques generally allow higher levels of complexity and easier scaling to finer geometry technologies than analog techniques, as well as superior testability and manufacturability.

Because of the computational intensity (and the associated power consumption by the processor(s)) for such transceiver functions, it is an important goal in the design of wireless and/or mobile communication devices to minimize processor and other module operations (and the associated power consumption). One way to manage power consumption in a system is to coordinate the operation of the various clocks that have high power consumption.

The various components in a wireless device have different operating requirements for the clock signals used for their operation. Network devices generally require high-speed, high-accuracy clocks. However, these clocks consume large amounts of power due to the power required to create a high-accuracy clock and also that consumed while switching the clock drivers and clock network at high frequencies. Therefore, network devices typically have power saving modes which allow stations to enter a low-power mode when the stations are not accessing the medium. Specifically, if the device is not transmitting or receiving, it is possible to conserve power by generating a lower frequency and lower accuracy clock signal which suffices to meet certain system requirements. Even in these low-power modes, however, it is important for the network that the device maintains its high-accuracy timers.

It would be desirable, therefore, to provide a wireless device having a power management system capable of conserving power by controlling the clock generator to provide different clock signals that are matched to the specific operational requirements of the system at any time. One solution employed by many existing systems is to disable the high-speed, high-accuracy clock to put the network in a low-power mode. However, this approach creates a number of potential problems. For example, network devices need to maintain high accuracy timers even when operating in a low-power mode. Also, other agents may attempt to interact with the device when it is not being clocked, requiring complicated synchronization with those agents, or continuing to clock interfaces even when operating in low power mode. Furthermore, complicated hardware may be required to start up the high-accuracy clock when an external agent requires interaction with the network devices.

In view of the foregoing, it is apparent that it would be desirable to provide a wireless device having a power management system capable of conserving power by controlling the clock generator to provide different clock signals that are matched to the specific operational requirements of the system at any time, while also providing a means to maintain proper operation of the device when operating in a low-power mode.

SUMMARY OF THE INVENTION

The present invention overcomes shortcomings of the prior art by providing a method and apparatus for providing first and second clock signals for a wireless communication device, with the first and second clock signals being generated at corresponding first and second power levels, depending on the operating mode of the wireless communication unit.

A clock generator operates in conjunction with a power management unit to provide first and second clock signals corresponding to first and second operating states of the wireless communication device. In the first operating state, the transceiver in the RF analog module is operational and the clock generator provides a first clock signal having the high-speed, high-accuracy characteristics necessary to maintain efficient operation of the transceiver. In a second operating state, the transceiver in the RF analog module is turned off. In this second operational state, the clock generator provides a second clock signal having a speed and quality sufficient to maintain efficient operation of the digital modules in the wireless communication device. Specifically, in the second operational state, the high-speed, high-accuracy clock is replaced by a low-power oscillator when the wireless communication unit is operating in a low power mode.

The power management logic is operable to measure the frequency of the low power oscillator, permitting the use of an oscillator whose specific frequency is not known a priori. The power management logic module of the present invention comprises a counter that is operable to specify duration of the low-power mode during which the high-speed, high-accuracy clock is replaced by the low-power oscillator. The power management logic module of the present invention is operable to maintain internal timers at a high level of accuracy during the low-power interval when the clock signal is being provided by the low power oscillator.

In the method and apparatus of the present invention, external agents are still able to access the device because the system interfaces are still being clocked, although at a lower frequency. In addition, using the output of the low-power oscillator, the high accuracy timers of the wireless communication device are still able to function. The power management logic is also operable to abort the low-power mode and to reactivate the high-speed, high-accuracy clock upon detection of certain events, such as an attempt by an agent to interact with the wireless communication device.

By switching between low-power mode and normal mode, the system is operable to provide a high-speed, high-accuracy clock signal for use by the RF analog module when it is operational and to provide a lower power, lower quality clock signal which is sufficient for use by the digital modules when the transceiver in the RF analog module is powered down.

The objects, advantages and other novel features of the present invention will be apparent from the following detailed description when read in conjunction with the appended claims and attached drawings.

DETAILED DESCRIPTION

A method and apparatus for an improved communications processor is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
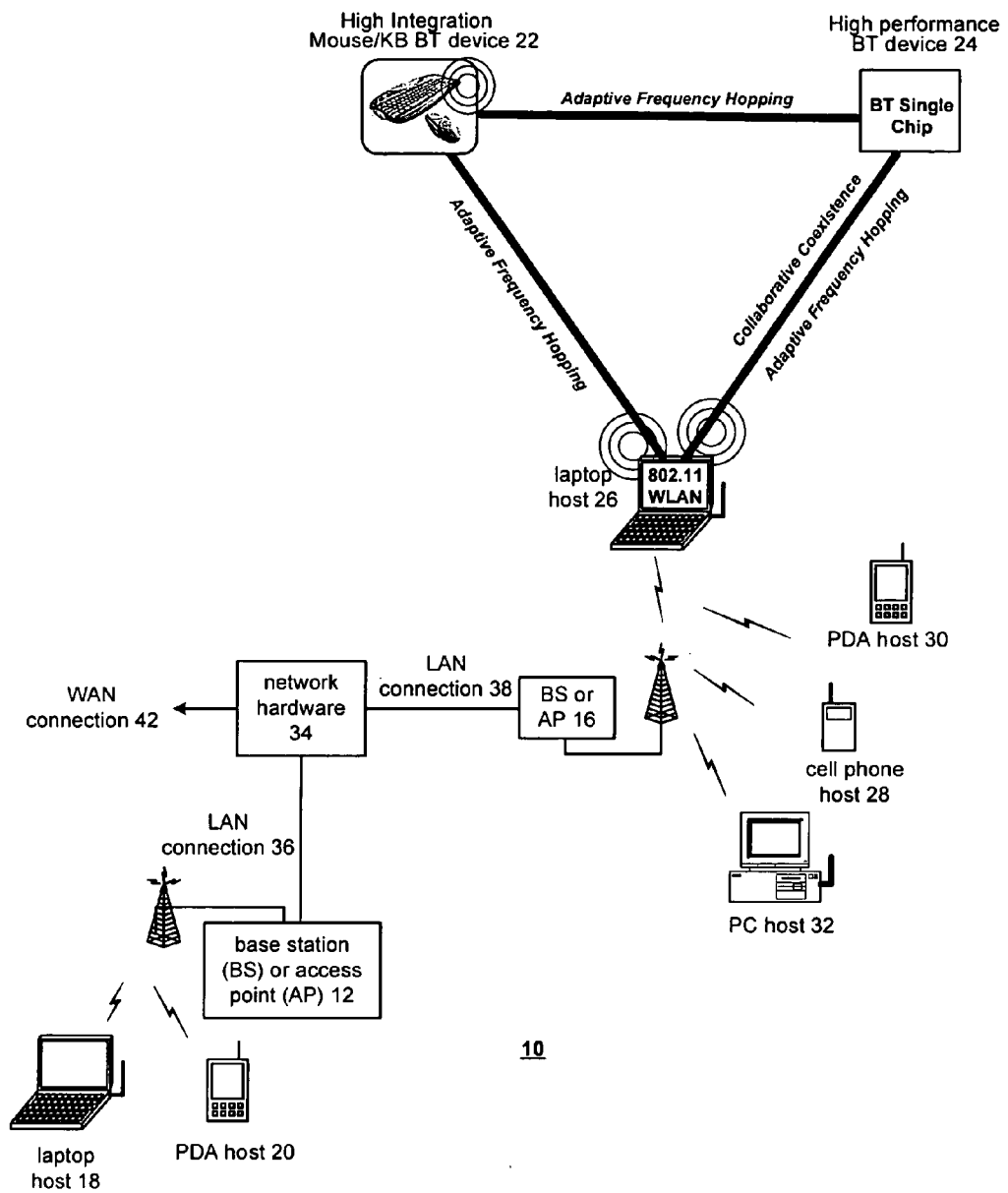
FIG. 1 is a schematic block diagram of a wireless communication system in accordance with an exemplary embodiment of the present invention.

FIG. 1 illustrates a wireless communication system 10 in which embodiments of the present invention may operate. As illustrated, the wireless communication system 10 includes a plurality of base stations and/or access points 12, 16, a plurality of wireless communication devices 18–32 and a network hardware component 34. The wireless communication devices 18–32 may be laptop host computers 18, 26, personal digital assistant hosts 20, 30, personal computer hosts 32, cellular telephone hosts 28 and/or wireless keyboards, mouse devices or other Bluetooth devices 22, 24. The details of the wireless communication devices will be described in greater detail with reference to FIGS. 2–5.

As illustrated, the base stations or access points 12, 16 are operably coupled to the network hardware 34 via local area network connections 36, 38. The network hardware 34 (which may be a router, switch, bridge, modem, system controller, etc.) provides a wide area network connection 42 for the communication system 10. Each of the base stations or access points 12, 16 has an associated antenna or antenna array to communicate with the wireless communication devices in its area. Typically, the wireless communication devices register with a particular base station or access point 12, 16 to receive services from the communication system 10. For direct connections (e.g., point-to-point communications between laptop 26 and mouse or keyboard 22), wireless communication devices communicate directly via an allocated channel.

Regardless of the particular type of communication system, each wireless communication device includes a built-in radio and/or is coupled to a radio. The radio includes a highly linear amplifier and/or programmable multi-stage amplifier with a low latency power saving mechanism as disclosed herein to enhance performance, reduce costs, reduce size, reduce power consumption and/or enhance broadband applications.

Figure 2:
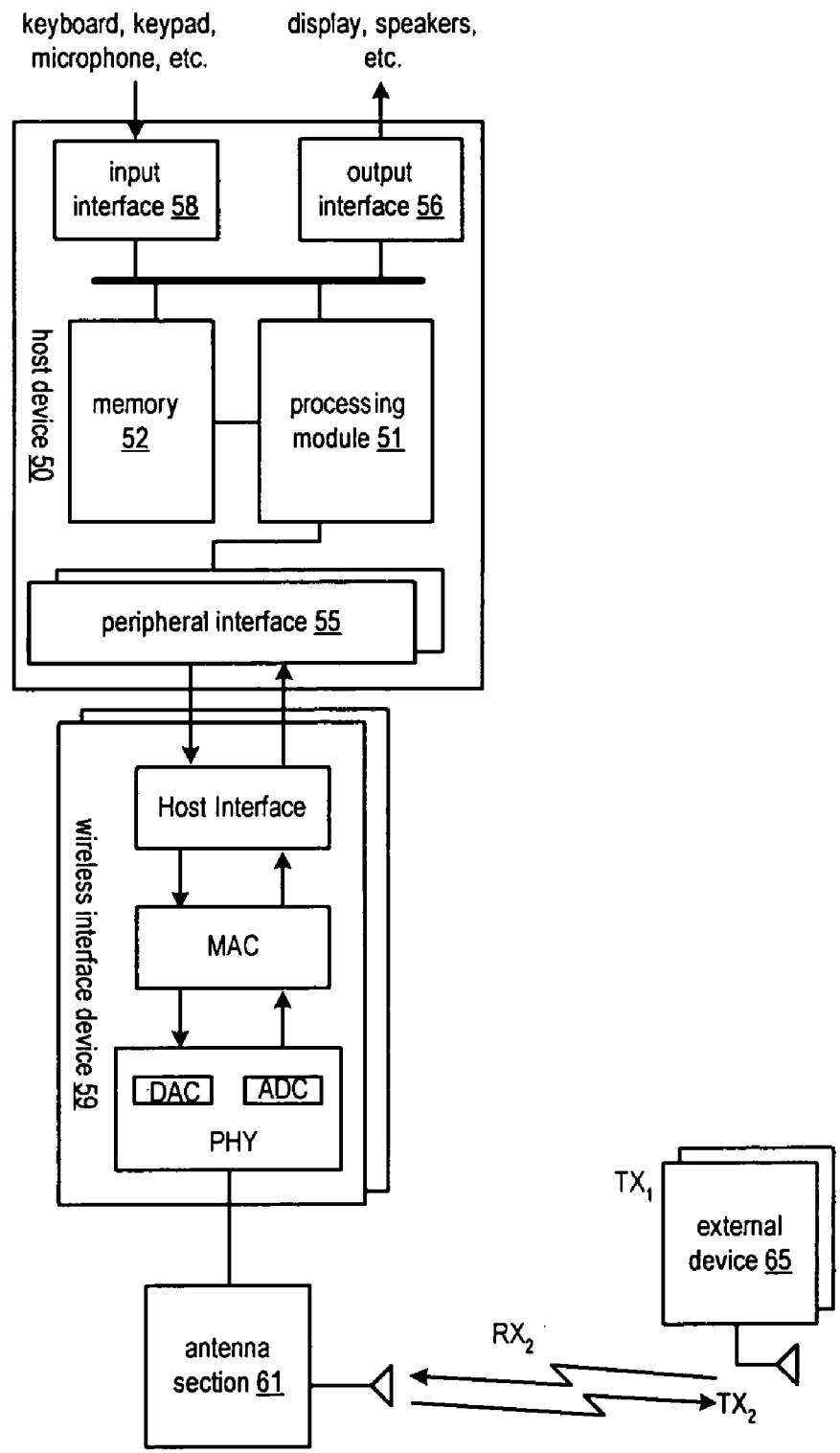
FIG. 2 is a schematic block diagram of a wireless communication device in accordance with an exemplary embodiment of the present invention.

FIG. 2 is a schematic block diagram illustrating a radio implemented in a wireless communication device that includes the host device or module 50 and at least one wireless interface device, or radio transceiver 59. The wireless interface device may be built in components of the host device 50 or externally coupled components. As illustrated, the host device 50 includes a processing module 51, memory 52, peripheral interface 55, input interface 58 and output interface 56. The processing module 51 and memory 52 execute the corresponding instructions that are typically done by the host device. For example, in a cellular telephone device, the processing module 51 performs the corresponding communication functions in accordance with a particular cellular telephone standard.

The wireless interface device 59 includes a host interface, a media-specific access control protocol (MAC) layer module, a physical layer module (PHY), a digital-to-analog converter (DAC), and an analog to digital converter (ADC). The peripheral interface 55 allows data to be received from and sent to one or more external devices 65 via the wireless interface device 59. As will be appreciated, the modules in the wireless interface device are implemented with a communications processor and an associated memory for storing and executing instructions that control the access to the physical transmission medium in the wireless network.

Each external device includes its own wireless interface device for communicating with the wireless interface device of the host device. For example, the host device may be personal or laptop computer and the external device 65 may be a headset, personal digital assistant, cellular telephone, printer, fax machine, joystick, keyboard, desktop telephone, or access point of a wireless local area network. In this example, external device 65 is an IEEE 802.11 wireless interface device.

Figure 3:
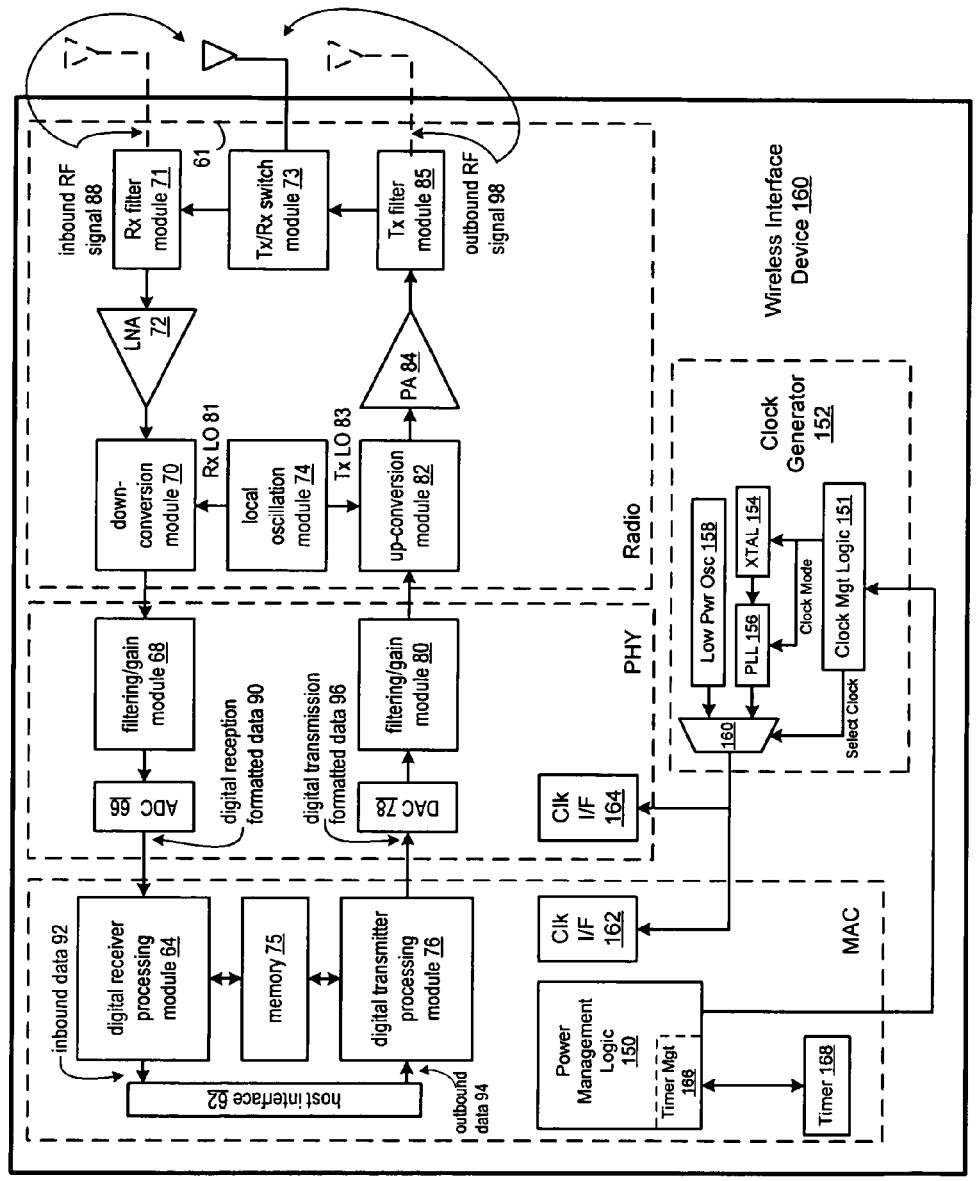
FIG. 3 is a schematic block diagram of a wireless interface device in accordance with an exemplary embodiment of the present invention.

FIG. 3 is a schematic block diagram of a wireless interface device (i.e., a radio) 60 which includes a host interface 62, digital receiver processing module 64, an analog-to-digital converter (ADC) 66, a filtering/attenuation module 68, an IF down-conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, an IF mixing up-conversion stage 82, a power amplifier 84, and a transmitter filter module 85. The transmitter/receiver switch 73 is coupled to the antenna 61, which may include two antennas coupled through a switch. Still further, the antenna section 61 may include separate multiple antennas for the transmit path and the receive path of each wireless interface device (as shown in FIG. 3). As will be appreciated, the antenna(s) may be polarized, directional, and be physically separated to provide a minimal amount of interference.

The digital receiver processing module 64, the digital transmitter processing module 76 and the memory 75 may be included in the MAC module (see FIG. 2) and execute digital receiver functions and digital transmitter functions in accordance with a particular wireless communication standard. The digital receiver functions include, but are not limited to, digital intermediate frequency to baseband conversion, demodulation, constellation demapping, decoding and/or descrambling. The digital transmitter functions include, but are not limited to, scrambling, encoding, constellation mapping, modulation and/or digital baseband to IF conversion. The digital receiver and transmitter processing modules 64, 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64, 76 implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In operation, the wireless interface device 60 receives outbound data 94 from the host device via the host interface 62. The host interface 62 routes the outbound data 94 to the digital transmitter processing module 76, which processes the outbound data 94 to produce digital transmission formatted data 96 in accordance with a particular wireless communication standard, such as IEEE 802.11 (including all current and future subsections), Bluetooth, etc. The digital transmission formatted data 96 will be a digital base-band signal or a digital low IF signal, where the low IF typically will be in the frequency range of one hundred kilohertz to a few megahertz. Subsequent stages convert the digital transmission formatted data to an RF signal, and may be implemented as follows. The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation clock 83 provided by local oscillation module 74. The power amplifier 84 amplifies the RF signal to produce outbound RF signal 98, which is filtered by the transmitter filter module 85. The antenna section 61 transmits the outbound RF signal 98 to a targeted device such as a base station, an access point and/or another wireless communication device.

The wireless interface device 60 also receives an inbound RF signal 88 via the antenna section 61, which was transmitted by a base station, an access point, or another wireless communication device. The inbound RF signal is converted into digital reception formatted data; this conversion may be implemented as follows. The antenna section 61 provides the inbound RF signal 88 to the receiver filter module 71 via the transmit/receive switch 73, where the receiver filter 71 bandpass filters the inbound RF signal 88. The receiver filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation clock 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device (e.g., 50) via the peripheral interface (e.g., 55).

As will be appreciated, the wireless communication device of FIG. 2 described herein may be implemented using one or more integrated circuits. For example, the host device 50 may be implemented on one integrated circuit, the digital receiver processing module 64, the digital transmitter processing module 76 and memory 75 may be implemented on a second integrated circuit, and the remaining components of the radio 60 and/or antenna 61, may be implemented on a third integrated circuit. As an alternate example, the radio 60 may be implemented on a single integrated circuit. As yet another example, the processing module 51 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 51 and the digital receiver and transmitter processing module 64 and 76. In a selected embodiment, the present invention shows, for the first time, a fully integrated, single chip 802.11b/g solution with built-in power management that reduces power consumption using an intelligent stand-by mode to provide greatly extended battery life for mobile devices, all implemented in CMOS (Complementary Metal Oxide Semiconductor), as part of a single chip or multi-chip transceiver radio.

As for the processor componentry of the wireless interface device or radio, an exemplary depiction of the processor details is illustrated in FIG. 3 as communication processor 100, which shows a system level description of the operation of an embodiment of a communication processor embodiment of the present invention. The communication processor 100 may be an integrated circuit or it may be constructed from discrete components. The communication processor 100 may implement a MAC module using a programmable state machine 102 (which includes the Fetch 141, Decode 143, Read 145, Execute 147 and Write 149 pipeline, in that order). The processor 100 also includes a memory 118, which may be implemented as a data RAM memory and code EPROM memory. Also included in the processor are the transmit/receive queues and supporting hardware 182 (coupled between host interface 181 and PHY interface 183), which may include transmit and receive FIFO buffers, encryption modules, transmit and receive engines and/or packet processing hardware. For power management of the processor 100, power-down logic 172 is provided, including the wake-up timer 134, logic to select wake-up conditions, and logic to direct modules to deactivate themselves.

To reduce the power consumed by processor-related circuits, the present invention provides a power management scheme to extend the battery life of Wi-Fi enabled small mobile devices. In a selected embodiment, the power management scheme uses a software approach to place the transceiver in standby mode and to selectively respond to wake-up commands, thereby reducing significantly less power without imposing a performance cost. In mobile device applications, the communications processor is able to spend a majority of its time in standby mode, adding several days of battery life to a PDA.

In a selected embodiment illustrated in FIG. 3, power management may be implemented using power management logic 150 to control operation of the clock generator 152 via the clock management module 151. The clock generator 152 is capable of generating two different clock signals depending on the operating mode of the wireless communications device. The crystal 154 and the phase-locked loop module 156 can be used to generate a high-speed, high-accuracy clock signal, while the low-power oscillator can be used to generate a lower accuracy clock signal that is acceptable for use by digital signal components in the MAC and PHY modules when the device is operating in a low-power mode. In an embodiment of the invention the high-speed, high accuracy clock has a frequency in the range of 80 MHz to 100 MHz. The clock provided by the low-power oscillator can have a frequency in the range of 30 KHz to 80 MHz (the lower end of the frequency range for the high-speed clock), but generally has a range of 30 KHZ to 100 KHz. The high-speed, high-accuracy clock signal and the low-power clock are each provided as inputs to the multiplexer 160 which provides the appropriate clock signal outputs to the clock distribution interfaces 162 and 164, depending on the operating power mode of the wireless communication device.

When the radio transceiver module is operational and the wireless communication device is operating in high-power mode, the power management module 150 provides an input signal to the clock management logic 151 causing it to generate a clock mode_high signal that enables the crystal 154 and PLL module 156 to generate the high-speed, high-accuracy clock signal. If, however, the radio transceiver module is not operational and the wireless communication device is operating in low-power mode, the power management module 150 provides an input signal to the clock management logic 151 causing it to generate a clock mode_low signal that disables the crystal 154 and PLL module 156. In this operating mode, the low-power oscillator will generate a low-power, lower-accuracy clock signal as an input to the multiplexer 160.

The power management logic 150 is operable to calibrate the frequency of the low-power oscillator 158 using the high-speed, high-accuracy clock signal generated by the crystal 154 and the PLL 156, thereby ensuring that the system can maintain high-accuracy timers while operating in the low-power mode. The power management logic module 150 of the present invention comprises a counter that is operable to specify duration of the low-power mode during which the high-speed, high-accuracy clock is replaced by the clock from the low-power oscillator 158. The timer management module 166 in the power management logic 150 is operable to store timing information, including timing information based on a cumulative count corresponding to the number of clock cycles during any predetermined time interval. The timer management module is further operable use calibration information from the power management logic to maintain the accuracy of the timer 168 when the system is operating with the clock from the low-power oscillator 158. In one embodiment, the timer 168 does not update its count based on the clock from the low-power oscillator 158; rather, the count is adjusted by the time management unit based on information received from the power management logic regarding the duration of the low-power mode of operation. In an alternate embodiment, the timer value is adjusted at every cycle of the clock generated by the low-power oscillator. The magnitude of the adjustment is the number of cycles that would have been generated by the high-speed clock during a single cycle of the clock generated by the low-power oscillator 158.

In the method and apparatus of the present invention, external agents are still able to access the device because the system interfaces are still being clocked. In addition, using the output of the low-power oscillator, the high accuracy timers of the wireless communication device are still able to function. The power management logic 150 is also operable to abort the low-power mode and to reactivate the high-speed, high-accuracy clock upon detection of certain events, such as an attempt by an agent to interact with the wireless communication device.

By switching between low-power mode and normal mode, the system is operable to provide a high-speed, high-accuracy clock signal for use by the RF analog module when it is operational and to provide a lower power, lower quality clock signal which is sufficient for use by the digital modules when the transceiver in the RF analog module is powered down.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A wireless communication system comprising:
a radio module operable to communicate data between a host and at least one external device;
at least one digital module operable to process data communicated by said radio module;
a clock generator for generating first and second clock signals for use by said digital module;
a timer operable to count clock cycles of said first and second clock signals;
power management logic operable to:
control said clock generator to cause said clock generator to generate said first clock signal when said wireless communication system is operating in a first power mode and to generate said second clock signal when said wireless communication system is operating in a second power mode; and
calibrate the frequency of said clock generator while said wireless communication system is operating in said second power mode; and
a timer management module operable to maintain a cumulative count of the number of clock cycles counted by said timer during a predetermined time interval, wherein said timer is operable to count the number of clock cycles for said first clock when said wireless communication system is operating in said first power mode and is further operable to count the number clock cycles for said second clock signal when said wireless communication system is operating in said second power mode;
wherein the number of clock cycles counted by said timer when said wireless communication system is operating in said second power mode is converted to an equivalent number of clock cycles that would have been generated by said first clock by using an adjustment factor based on the number of cycles said first clock would generate during a single cycle of said second clock.

2. A wireless communication system, comprising:
a radio module operable to communicate data between a host and at least one external device;
at least one digital module operable to process data communicated by said radio module;
a clock generator for generating first and second clock signals for use by said digital module;
a timer operable to count clock cycles of said first and second clock signals, said timer operable to count the number of clock cycles for said first clock when said wireless communication system is operating in said first power mode and said timer does not count the number of clock cycles for said first clock signal when said wireless communication system is operating in said second power mode;
a timer management module operable to maintain a cumulative count of the number of clock cycles counted by said timer during a predetermined time interval, wherein said timer management module is operable to generate updated timing information using information provided by said power management logic regarding the duration of the time interval that said wireless communication system is operating in said second power mode; and
power management logic operable to:
control said clock generator to cause said clock generator to generate said first clock signal when said wireless communication system is operating in a first power mode and to generate said second clock signal when said wireless communication system is operating in a second power mode; and
calibrate the frequency of said clock generator while said wireless communication system is operating in said second power mode.

3. A method of managing power in a wireless communication system having a radio module operable to communicate data between a host and at least one external device and at least one digital module operable to process data communicated by said radio module, the method comprising:
generating a high-frequency first clock signal for use by said digital module when said wireless communication system is operating in a first power mode and a lower frequency second clock signal for use by said digital module when said wireless communication system is operating in a second power mode; and
using power management logic to:
control said clock generator to cause said clock generator to generate said first clock signal when said wireless communication system is operating in a said first power mode and to generate said second clock signal when said wireless communication system is operating in said second power mode; and calibrate the frequency of said clock generator while said wireless communication system is operating in said second power mode using a timer to count clock cycles of said first and second clock signals;

using said timer to count the number of clock cycles for said first clock when said wireless communication system is operating in said first power mode and using said timer to count the number clock cycles for said second clock signal when said wireless communication system is operating in said second power mode; and using a timer management module to maintain a cumulative count of the number of clock cycles counted by said timer during a predetermined time interval, wherein the number of clock cycles counted by said timer when said wireless communication system is operating in said second power mode is converted to an equivalent number of clock cycles that would have been generated by said first clock by using an adjustment factor based on the number of cycles said first clock would generate during a single cycle of the said second clock.

4. A method of managing power in a wireless communication system having a radio module operable to communicate data between a host and at least one external device and at least one digital module operable to process data communicated by said radio module, the method comprising:

generating a high-frequency first clock signal for use by said digital module when said wireless communication system is operating in a first power mode and a lower frequency second clock signal for use by said digital module when said wireless communication system is operating in a second power mode; and using power management logic to:

control said clock generator to cause said clock generator to generate said first clock signal when said wireless communication system is operating in a said first power mode and to generate said second clock signal when said wireless communication system is operating in said second power mode; and calibrate the frequency of said clock generator while said wireless communication system is operating in said second power mode using a timer to count clock cycles of said first and second clock signals, wherein said timer counts the number of clock cycles for said first clock when said wireless communication system is operating in said first power mode and said timer does not count the number of clock cycles for said first clock signal when said wireless communication system is operating in said second power mode;

using a timer management module to maintain a cumulative count of the number of clock cycles counted by said timer during a predetermined time interval; and using said timer management module to generate updated timing information using information provided by said power management logic regarding the duration of the time interval that the wireless communication system is operating in said second power mode.

* * * * *